United States Patent
Yoon et al.

(10) Patent No.: US 7,018,109 B2
(45) Date of Patent: Mar. 28, 2006

(54) OPTICAL RECEIVER OF BIDIRECTIONAL OPTICAL COMMUNICATION MODULE AND METHOD FOR MANUFACTURING THE SAME

(75) Inventors: Young-Kwon Yoon, Anyang-si (KR); Sun-Hyoung Pyo, Incheon (KR); Hyun-Ho Ryoo, Suwon-si (KR); Gi-Tae Mun, Suwon-si (KR); Tsumori Masahiko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 10/859,704

(22) Filed: Jun. 3, 2004

(65) Prior Publication Data

US 2005/0147354 A1    Jul. 7, 2005

(30) Foreign Application Priority Data

Jan. 5, 2004    (KR) ............... 10-2004-0000382

(51) Int. Cl.
   *G02B 6/36*    (2006.01)

(52) U.S. Cl. .................. 385/88; 14/65; 14/83
(58) Field of Classification Search .............. 385/14, 385/88–94, 65, 83; 257/81, 99, 100, 433, 257/434, 678; 361/728–745, 752–759
See application file for complete search history.

(56) References Cited

U.S. PATENT DOCUMENTS 6,332,719 B1 * 12/2001 Nishikawa et al. ........... 385/88
2005/0117831 A1 * 6/2005 Komiya et al. ............... 385/14

* cited by examiner

*Primary Examiner*—Phan T. H. Palmer
(74) *Attorney, Agent, or Firm*—Cha & Reiter, L.L.C.

(57) ABSTRACT

An optical receiver of a bidirectional optical communication module is fabricated through an assembling process in which multiple modules are assembled concurrently. The module includes a first substrate formed with a groove, an optical fiber located in the groove and having a flat surface, a reflective filter inserted between the first substrate and the fiber with a predetermined inclination angle in order to reflect an incident optical signal, a second substrate supporting the fiber and mounted on the first substrate such that the flat surface.

20 Claims, 5 Drawing Sheets

OPTICAL RECEIVER OF BIDIRECTIONAL OPTICAL COMMUNICATION MODULE AND METHOD FOR MANUFACTURING THE SAME

CLAIM OF PRIORITY

This application claims priority to an application entitled "Optical Receiver of Bidirectional Optical Communication Module and Method for Manufacturing the Same" filed in the Korean Intellectual Property Office on Jan. 5, 2004 and assigned Serial No. 2004-00382, the contents of which are hereby incorporated herein by reference.

BACKGROUND OF THE INVENTION

1. Field of the Invention

The present invention relates to an optical module, and more particularly to an optical receiver of a bidirectional optical communication module, which is fabricated through an assembling process concurrent and integral with an assembling process applied to a wafer, and a method for fabricating the optical receiver.

2. Description of the Related Art

In general, each module is separately assembled when fabricating a communication optical module. If such a communication optical module is fabricated concurrently and integrally with an assembling process applied to a wafer, i.e., in which a plurality of modules are assembled at once, costs for the assembling process may be reduced, so the optical module can be fabricated at a low price.

FIGS. 1A and 1B are views showing a conventional structure of bidirectional optical communication module disclosed in U.S. Pat. No. 6,332,719. FIG. 1B is a sectional view taken along line A–A' in FIG. 1A. Referring to FIGS. 1A and 1B, an optical fiber 130 is installed in a V-groove formed at an SiOB (Silicon Optical Bench) 120, and WDM filters 124, 125 are inserted into holes formed in the optical fiber. In addition, photodiodes 126, 127 are attached to proper portions of the SiOB 120 by considering an insertion position and an insertion angle of the WDM filters. SiOB 120 having the photodiodes 126 and 127 is attached to an SiOB 110, to which a laser diode 111 and a monitor photodiode 112 are attached. At this time, it is necessary to precisely align an end of the optical fiber 116 with the laser diode 111. Alternatively, the SiOB 120 having the photodiodes 126, 127 can be integrally formed with the SiOB 110 having the laser diode 111 and the monitor photodiode 112.

Operationally, with the module acting as a receiver, light incident into the optical fiber 116 is reflected from WDM filters 124, 125 and is introduced into the photodiodes 126, 127, so the photodiodes detect the light. At this time, the number of channels for incident signals may be increased by differently forming a wavelength of the incident light in each of channels.

When the module acts as a transmitter, a transmitting signal radiated from laser diode 111 is optically coupled with the optical fiber 130, and then, linearly proceeds to an exterior. To prevent transmitting and receiving signals from mutually interfering when simultaneously issued, it is necessary to form a wavelength of transmitting light differently from a wavelength of receiving light.

Problematically, however, for the conventional module structured with the SiOB having the photodiodes. It is impossible to assemble the module concurrently and integrally with the assembling process applied to a wafer. The need for a separate process entails extra expense, making it difficult to fabricate the optical module at a low price.

An added difficulty is that the receiving sensitivity of the photodiode may deteriorate depending on the insertion angle of a filter. Light reflected by a wavelength division multiplexing (WDM) filter propagates through free space and is incident into the photodiode. The propagation length of the light may depend on the insertion angle of the filter. If the insertion angle of the filter is 45°, the propagation length becomes minimized. If the radius of the optical fiber slightly exceeds 62.5, a minimum value of the radius of an incident beam at a surface of the photodiode is 62.5 sin(FFA of SMF) assuming a distance between an outer surface of the optical fiber and a surface of the photodiode is 0 (zero). At this time, the incident light, which has passed through an optical fiber core, continuously passes through a glass medium or a medium having a refractive index identical to the refractive index of the glass medium. Therefore, FFA of SMF may be about 4° taking into account the reflective index 1.5 of the medium when NA is 0.1 in a general free space. The radius of the incident beam at the surface of the photodiode is thus 17.

The optical transmitting/receiving module can be fabricated through a conventional technique as shown in FIG. 1 if an insertion angle of the filter is maintained at 45° since the diameter of incident light of a light receiving device of 1.25 GHz corresponding to a data speed of an E-PON bidirectional optical transmitting/receiving module of FTTH optical modules is ~60. However, it is impossible, when the optical transmitting/receiving module is applied to a triplexer for FTTH, to maintain the insertion angle of the filter at 45°. For reference, a maximum incident angle of about 20° is realized through the current technique.

SUMMARY OF THE INVENTION

The present invention has been made to solve the above-mentioned problem occurring in the prior art, and an object of the present invention is to provide an optical receiver of bidirectional optical communication module adaptable for a high-speed light-receiving device receiving incident light having a small diameter, and a method for fabricating the same.

Another object of the present invention is to provide an optical receiver of a bidirectional optical communication module, which is fabricated through an assembling process identical to an assembling process applied to a wafer, and a method for fabricating the optical receiver.

In order to accomplish above objects, according to the present invention, there is provided an optical receiver of a bidirectional optical communication module, the optical receiver comprising a substrate formed with a recess; an optical fiber located in the recess and having a flat surface; a reflective filter arranged between the substrate and the optical fiber with a predetermined inclination angle in order to reflect an incident optical signal; and a light receiving device mounted on the substrate in such a manner that the light receiving device at least makes contact with the flat surface of the optical fiber for receiving the optical signal reflected by the reflective filter.

Preferably, the reflective filter is arranged in such a manner that the inclination angle of the reflective filter is equal to or less than 30°.

Preferably, the optical fiber includes a core and a clad surrounding the core, and the flat surface is formed at the clad.

More preferably, the recess includes a V-groove or a U-groove.

In order to accomplish above objects, according to another aspect of the present invention, there is provided a method for manufacturing an optical receiver of a bidirectional optical communication module, the method comprising the steps of (a) forming a recess on a substrate; (b) arranging an optical fiber in the recess; (c) exposing the optical fiber to an upper portion of the substrate, and polishing the substrate or the optical fiber in such a manner that the exposed optical fiber has a flat surface; (d) forming a hole having a predetermined inclined angle in the optical fiber and the substrate, and inserting a reflective filter into the hole; and (e) mounting a light receiving device on the substrate in such a manner that the light receiving device at least makes contact with the flat surface of the optical fiber for receiving an optical signal reflected by the reflective filter.

Preferably, in step (a), a V-groove or U-groove is formed in the substrate.

More preferably, in step (c), a clad is polished such that a core of the optical fiber is prevented from being damaged.

BRIEF DESCRIPTION OF THE DRAWINGS

The above features and advantages of the present invention will be more apparent from the following detailed description taken in conjunction with the accompanying drawings, in which the same reference numerals are used to designate the same or similar components throughout the several views.

DETAILED DESCRIPTION

Figure 2:
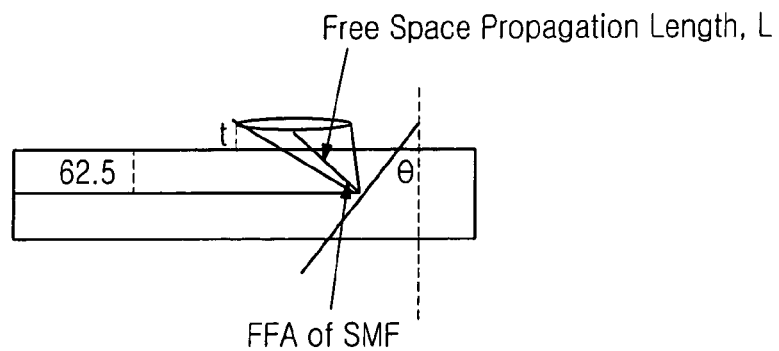
FIG. 2 is a view showing a size of incident light according to a diffraction of receiving light reflected by a filter.

FIG. 2 illustrates a radius of incident light at a surface of a photodiode in accordance with the present invention, the light having been reflected by a filter and diffracted. When an insertion angle of a filter is θ, a minimum value of a radius of incident light at a surface of a photodiode can be obtained. That is, a propagation distance L of light in a free space is calculated according to the following equation by considering an interval t between an outer surface of an optical fiber and the photodiode.

$$L=(t+62.5)/\sin\theta$$

Reflective light is spread out due to the diffraction of light while traveling through the free-space. In particular, when the reflective light has traveled over the propagation distance L, a size of incident light is L(sin(FFA of SMF)) at a surface perpendicular to a traveling direction of the incident light. Accordingly, the size R of the incident light at the surface of the photodiode is as follows.

$$R = L(\sin(FFA \text{ of } SMF = \sim 3.8°))\sin\theta$$
$$= (t + 62.5)\sin(FFA \text{ of } SMF = 3.8°)\sin 2\theta$$

The size R of the incident light at the surface of the photodiode according to the interval t between the outer surface of the optical fiber and the surface of the photodiode and an incident angle θ of the filter, which are obtained from the above equation, is represented in Table 1 below.

TABLE 1

| t = 0   | 35.4 | 46.8, 63.7, 84.2 |
| t = 100 | 92.1 | 121, 18.4, 24.3  |

θ = 20  θ = 15

It is understood from the above table 1 that the size of incident light at the surface of the photodiode is significantly reduced as the interval between a core and the photodiode is reduced.

Figure 3:
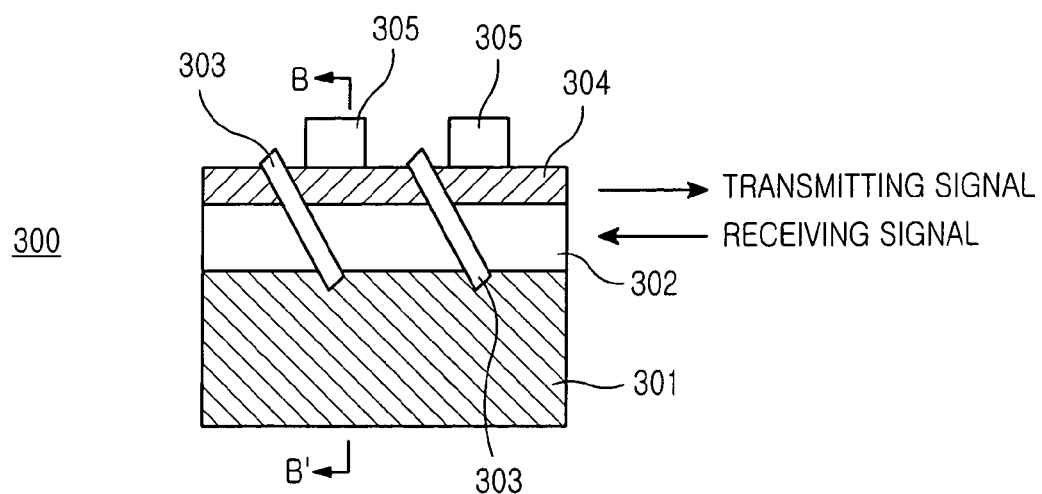
FIG. 3 is a view showing a structure of an optical receiver module according to one embodiment of the present invention.
Figure 4:
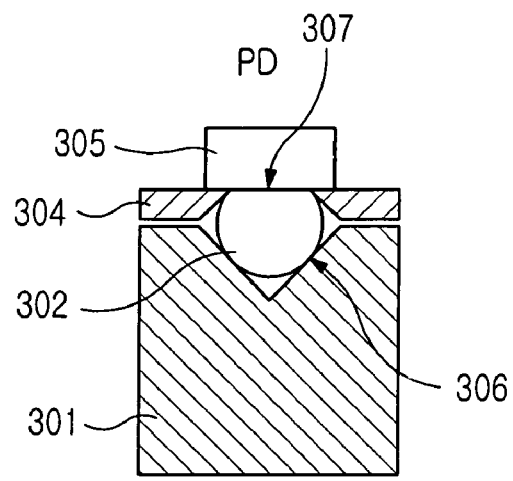
FIG. 4 is a sectional view taken along line B–B' in FIG. 3.

FIG. 3 is a view showing a structure of an optical receiver module according to one embodiment of the present invention, and FIG. 4 is a sectional view taken along line B–B' in FIG. 3.

Referring to FIGS. 3 to 4, an optical receiver module 300 according to the present invention includes a first substrate 301, an optical fiber 302, reflective filters 303, a second substrate 304, and a light receiving device 305.

The first substrate 301, such as a silicon substrate, includes a recess for aligning an optical fiber, that is, a V-groove 306. The recess can be formed in various shapes, such as a V-groove and U-groove.

The optical fiber 302 is arranged in the V-groove 306 of the first substrate 301 in order to transmit an optical signal. The optical fiber 302 includes a core and a clad surrounding the core. The optical fiber 302 has a flat surface 307, which is formed by polishing the clad of the optical fiber 302 having a circular shape. By polishing the optical fiber, a distance between the light receiving device and the core mounted on the optical fiber can be shortened.

The reflective filter 303 is inserted between the first substrate 301 and the optical fiber 302 with an angle of a predetermined inclination in order to reflect an optical signal incident thereto.

The second substrate 304, such as a glass, has a V-groove similar to the V-groove of the first substrate 301, and is mounted on the first substrate 301 in such a manner that the flat surface 307 of the optical fiber 302 is exposed to an exterior.

The light receiving device 305, such as a photodiode, is mounted on the second substrate 304 in such a manner that the light receiving device 305 makes contact with the flat surface 307 of the optical fiber 302.

Although it is illustrated that the optical fiber 302 having the flat surface 307 is arranged between the first substrate 301 and the second substrate 304 in the present embodiment, an optical fiber can be mounted on one substrate having a relatively deep recess.

In addition, even though it is not illustrated, a conductive pattern can be formed through the second substrate and the flat surface of the optical fiber for facilitating an operation of the light receiving device.

Figure 1A:
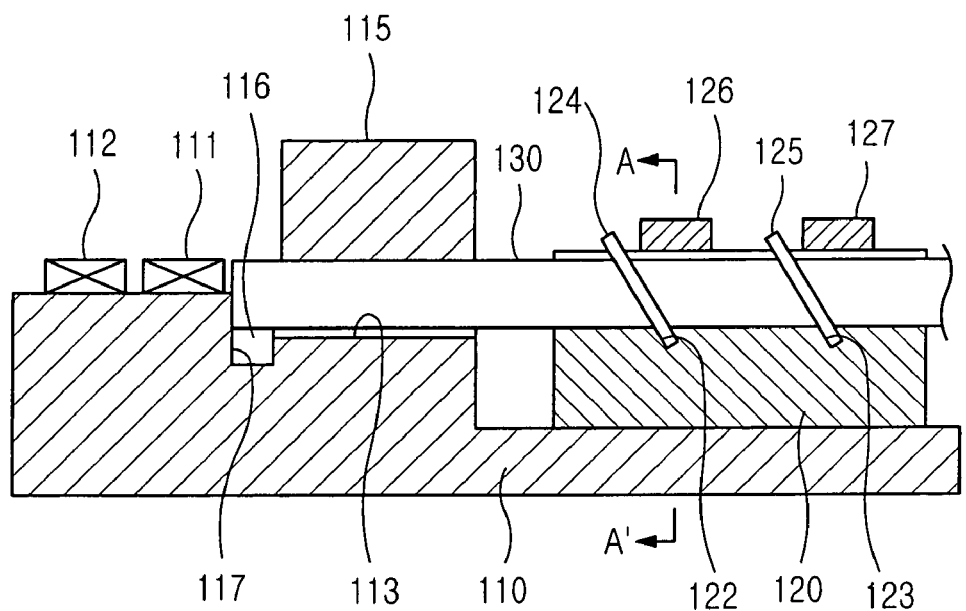
FIG. 1A is a view showing a conventional structure of a bidirectional optical communication module.
Figure 1B:
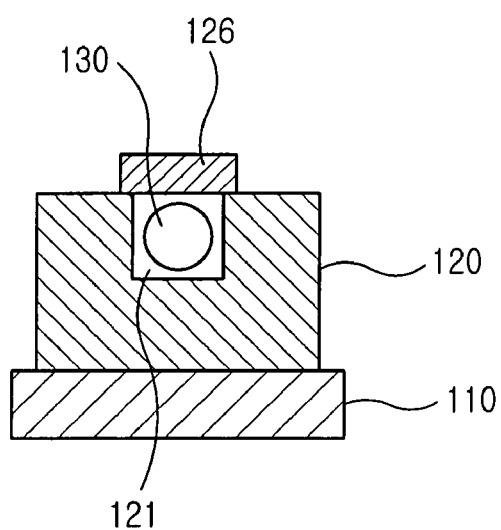
FIG. 1B is a sectional view taken along line A–A' in FIG. 1A.

Operationally, light incident through the optical fiber 302 is reflected by the reflective filter 303, so light is incident into and detected by the light receiving device 305. As shown in Table 1, if a distance between the core of the optical fiber 302 planarized through a polishing process and the light receiving device 305 is about 30 and if the insertion angle of the reflective filter 303 is 20°, incident light received in the surface of the light receiving device 305 has a diameter about 37 so that it can be applied to a high-speed light receiving device of at least 1 GHz. Meanwhile, it is understood from Table 1 above that the conventional optical module structure shown in FIG. 1 when applied to the high-speed light receiving device of at least 1 GHz, is limited to incident light having a small diameter is incident if the insertion angle of the reflective filter is 20.

FIGS. 5a to 5e are views showing a process for assembling the optical receiver module of FIG. 3 according to one embodiment of the present invention.

Figure 5A:
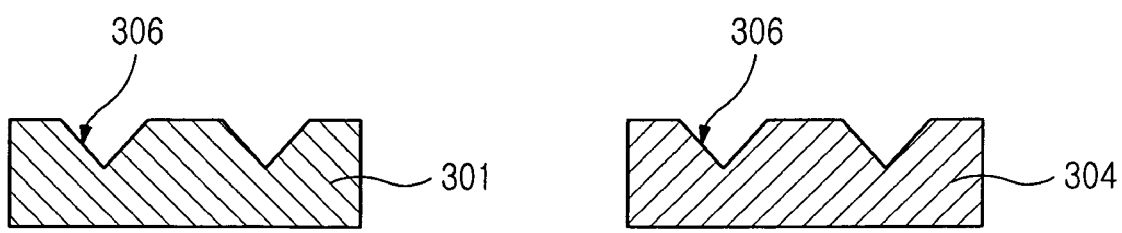
FIGS. 5a to 5e are views showing a process for fabricating the optical receiver module of FIG. 3, according to one embodiment of the present invention.

Firstly, as shown in FIG. 5a, a plurality of V-grooves 306 of identical size is formed in the first substrate 301 and the second substrate 304. It is alternatively possible to form a recess having relatively a deep depth, such as a V-groove, on one substrate.

Figure 5B:
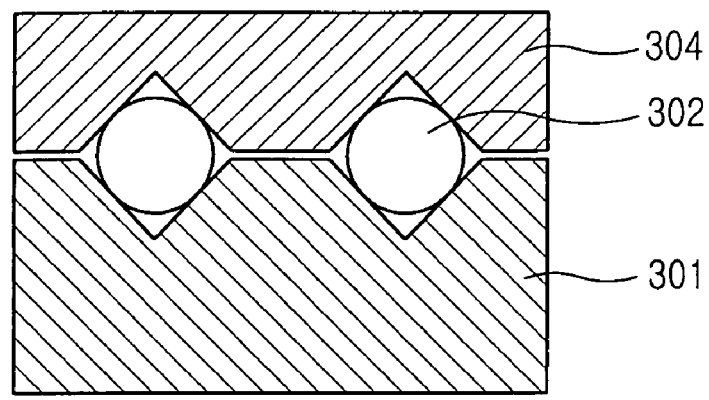

According to FIG. 5b, after the optical fiber 302 has been mounted on the V-groove 306 of the first substrate 301, the second substrate 304 is mounted on the first substrate 301.

Figure 5C:
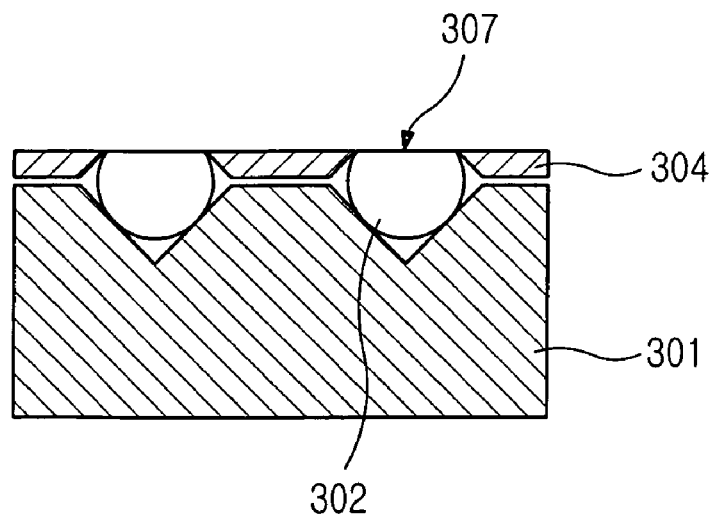

According to FIG. 5c, the second substrate 304 and the clad of the optical fiber 302 are polished in such a manner that the flat surface 307 is formed in the optical fiber 302, so the flat surface 307 of the optical fiber 302 is exposed through an upper portion of the second substrate 304. When polishing the optical fiber 302, only a predetermined portion of the clad is polished, in such a manner that the core of the optical fiber is not damaged.

Figure 5D:
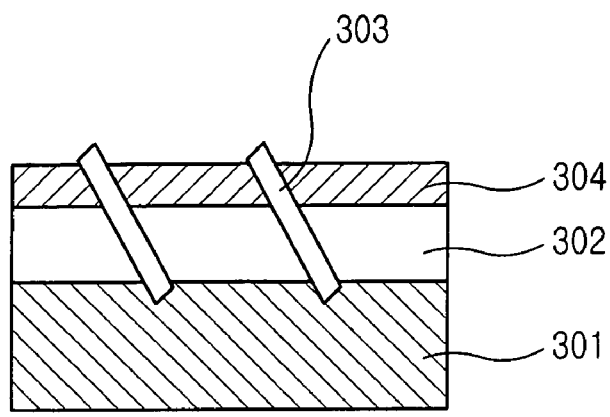

According to FIG. 5d, an electrode or a solder (not shown) is formed on the second substrate 304, as necessary, in which the flat surface 307 of the optical fiber 302 is exposed. Inclined holes are formed in the second substrate 304, the optical fiber 302 and the first substrate 301, and the WDM reflective filters 303 are inserted into the inclined holes.

Figure 5E:
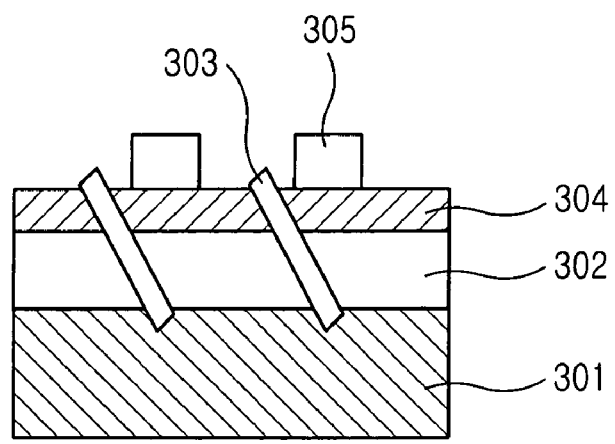

According to FIG. 5e, the light receiving device 305 is mounted on the second substrate 304 in such a manner that the light receiving device receives an optical signal reflected by the WDM reflective filter 303. At this time, as shown in FIG. 4, the light receiving device 305 is mounted on the second substrate 304 in such a manner that the light receiving device 305 makes contact with the flat surface 307 of the optical fiber 302.

As described above, the optical fiber clad of the receiving module of the present invention is polished in order to shorten a distance between the core of the optical fiber and the light receiving device. The optical receiving module of the present invention can therefore be applied in a high speed light-receiving device into which incident light having a small diameter is incident.

In addition, when the optical receiving module of the present invention is applied to the bidirectional optical receiving module, the bidirectional optical receiving module can be fabricated through an assembling process concurrent and integral with the assembling process applied to the wafer, so costs for assembling the bidirectional optical receiving module may be reduced and the optical module can be fabricated at a low price.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An optical receiver of a bidirectional optical communication module, the optical receiver comprising:
    a substrate formed with a recess;
    an optical fiber located in the recess and having a flat surface;
    a reflective filter arranged between the substrate and the optical fiber with a predetermined inclination angle in order to reflect an incident optical signal; and
    a light receiving device mounted on the substrate in such a manner that the light receiving device at least makes contact with the flat surface of the optical fiber for receiving the optical signal reflected by the reflective filter.

2. The optical receiver according to claim 1, further including an upper substrate supported by the fiber and which supports the light receiving device.

3. The optical receiver according to claim 2, wherein the filter extends into the upper substrate.

4. The optical receiver according to claim 1, further comprising a conductive pattern formed on the substrate including the flat surface of the optical fiber for operating the light receiving device.

5. The optical receiver according to claim 1, wherein the recess includes a V-groove.

6. The optical receiver according to claim 1, wherein the recess includes a U-groove.

7. The optical receiver according to claim 1, wherein the substrate includes any one selected from the group consisting of silicon-and silica glass.

8. The optical receiver according to claim 1, wherein the optical fiber includes a core and a clad surrounding the core, and the flat surface is formed at the clad.

9. The optical receiver according to claim 1, wherein the reflective filter is arranged in such a manner that the inclination angle of the reflective filter is equal to or less than 30°.

10. An optical receiver of a bidirectional optical communication module, the optical receiver comprising:
    a first substrate formed with a recess;
    an optical fiber located in the recess and having a flat surface;
    a reflective filter inserted between the first substrate and the optical fiber with a predetermined inclination angle in order to reflect an incident optical signal;
    a second substrate supporting the optical fiber and mounted on the first substrate such that the flat surface of the optical fiber is exposed; and
    a light receiving device mounted on the second substrate in such a manner that the light receiving device at least makes contact with the flat surface of the optical fiber for receiving the optical signal reflected by the reflective filter.

11. The optical receiver according to claim 10, wherein the recess includes a V-groove or a U-groove.

12. The optical receiver according to claim 10, wherein the optical fiber includes a core and a clad surrounding the core, and the flat surface is formed at the clad.

13. A method for manufacturing an optical receiver of a bidirectional optical communication module, the method comprising the steps of;
    (a) forming a recess on a substrate;
    (b) arranging an optical fiber in the recess so that the fiber is exposed through an upper portion of the recess;
    (c) flattening an exposed part of the fiber and/or a portion of the substrate that surrounds said part to form a flat surface;

(d) forming a hole having a predetermined inclined angle in the optical fiber and the substrate, and inserting a reflective filter into the hole; and (e) mounting a light receiving device on the substrate in such a manner that the light receiving device at least makes contact with said flat surface for receiving an optical signal reflected by the reflective filter.

14. The method according to claim 13, wherein, in step (c), the flattening includes polishing.

15. The method according to claim 14, wherein a clad is polished such that a core of the optical fiber is prevented from being damaged.

16. The method according to claim 13, wherein, in step (a), a V-groove or an U-groove is formed in the substrate.

17. The method according to claim 13, wherein, in step (d), the inclination angle of the hole is equal to or less than 30°.

18. The method according to claim 13, further comprising a step of forming a conductive pattern on the substrate including said flat surface for operating the light receiving device.

19. A method for manufacturing an optical receiver of a bidirectional optical communication module, the method comprising the steps of:

(a) forming at least one groove on each of a first substrate and a second substrate;

(b) arranging an optical fiber on the groove of the first substrate;

(c) mounting the second substrate on the first substrate in such a manner that the optical fiber is arranged in the groove of the second substrate;

(d) exposing the optical fiber through an upper portion of the second substrate, and polishing the second substrate and the optical fiber in such a manner that the exposed optical fiber has a flat surface;

(e) forming a hole having a predetermined inclined angle in the second substrate, the optical fiber and the first substrate, and inserting a reflective filter into the hole; and (f) mounting a light receiving device on the second substrate in such a manner that the light receiving device at least makes contact with the flat surface of the optical fiber for receiving an optical signal reflected by the reflective filter.

20. The method according to claim 19, wherein the first substrate and the second substrate have lateral dimensions identical to each other.

* * * * *